(12) United States Patent
Nakamura

(10) Patent No.: US 11,462,913 B2
(45) Date of Patent: Oct. 4, 2022

(54) POWER CONTROL SYSTEM, POWER CONTROL DEVICE AND CONTROLLED DEVICE

(71) Applicant: YAZAKI CORPORATION, Tokyo (JP)

(72) Inventor: Yoshihide Nakamura, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/931,962

(22) Filed: May 14, 2020

(65) Prior Publication Data

US 2020/0403409 A1 Dec. 24, 2020

(30) Foreign Application Priority Data

Jun. 19, 2019 (JP) .............................. JP2019-113603

(51) Int. Cl.
| | |
|---|---|
| *H02J 1/00* | (2006.01) |
| *H02J 3/00* | (2006.01) |
| *H02J 3/38* | (2006.01) |
| *H02J 3/32* | (2006.01) |
| *H02J 7/35* | (2006.01) |

(52) U.S. Cl.
CPC ............... *H02J 3/381* (2013.01); *H02J 3/32* (2013.01); *H02J 7/35* (2013.01); *H02J 2300/26* (2020.01)

(58) Field of Classification Search
CPC ...... H02J 3/381; H02J 3/32; H02J 7/35; H02J 2300/26; H02J 7/0063; H02J 7/36; Y02E 10/56; G05B 2219/2637; G05B 19/042; G05B 2219/2231; B60R 16/03; B60R 16/033
USPC .......................................................... 307/80
See application file for complete search history.

(56) References Cited

U.S. PATENT DOCUMENTS

| | | | |
|---|---|---|---|
| 9,947,144 B2* | 4/2018 | Kim ..................... | G06F 11/3024 |
| 10,153,650 B2* | 12/2018 | Ni Scanaill ............ | H02J 7/008 |
| 2009/0001926 A1 | 1/2009 | Sato | |
| 2009/0179495 A1 | 7/2009 | Yeh | |
| 2014/0079960 A1* | 3/2014 | Yun ..................... | H01M 10/482 |
| | | | 429/7 |
| 2020/0044454 A1* | 2/2020 | Su ............................. | G05F 1/67 |

FOREIGN PATENT DOCUMENTS

| | | |
|---|---|---|
| DE | 202008014919 U1 | 4/2009 |
| EP | 2325970 A2 | 5/2011 |
| JP | 07-302130 A | 11/1995 |
| JP | 2018-129964 A | 8/2018 |

* cited by examiner

*Primary Examiner* — Richard Tan
(74) *Attorney, Agent, or Firm* — Sughrue Mion, PLLC

(57) ABSTRACT

An electric power control system capable and a control device and a controlled device of electric power simplifying and reducing the cost of a slave device and electric power are provided. A power control system includes a master device supplied with power from a battery and a slave device powered by the battery through the master device. The slave device can also be supplied from a sub-battery or a solar cell that is different from the battery, the master device is provided with a control unit for controlling the slave device to be powered from the battery and the solar cell based on the power supply state of the battery and the solar cell.

8 Claims, 10 Drawing Sheets

POWER CONTROL SYSTEM, POWER CONTROL DEVICE AND CONTROLLED DEVICE

BACKGROUND OF THE INVENTION

Field of the Invention

The present invention relates to a power control system and a power control device and a controlled device for controlling power to be supplied from a power supply source.

Description of the Related Art

In recent years, automobiles have become more electronic, and the number of electrical components mounted on automobiles has been increasing. In order to suppress an increase in the number of wires, a master-slave method has been used. In the master-slave method, apart from a plurality of slave devices (controlled devices) that control individual electrical components, a master device (main control device) that collectively controls the slave device is provided.

Here, power is supplied from the slave device to the above-described load that servs as the electrical component. The power supplied to the slave device may be supplied not only from the master device, but also from sub-battery or solar cell. With this configuration, load on the main battery can be reduced.

Further, in such a configuration, the slave device executes processing of determination of a state of charge of the sub-battery, or processing such as maximum power point tracking (MPPT) for solar cell (refer to Patent Literature 1 for the MPPT).

CITATION LIST

Patent Literature

[Patent Literature 1] JP-A-H7-302130

SUMMARY OF THE INVENTION

Processing such as the MITT described above requires a sophisticated microcomputer or such a large peripheral circuit as described in Patent Literature 1. Therefore, it may be difficult to simplify a function of the slave device and reduce the cost.

Accordingly, an object of the present invention is, in view of the above-described problems, to provide a power control system, a power control device, and a controlled device that can achieve simplifying the slave device and reducing the cost.

The invention made to solve the above-mentioned problem is a power control system including a main control device supplied with power from a first power supply source and a controlled device supplied with power from the first power supply source through the main control device, the power control system including; a second power supply source different from the first power supply source capable of supplying power to the controlled device, wherein the main control device controls the controlled device such that power is suppled from the second power supply source to the controlled device based on information on a power supply state of the second power supply source acquired from the controlled device.

According to the present invention as described above, since, in the main control device, power supply to the controlled device is controlled based on the state of power supply of the second power supply source, processing in the controlled device can be simplified. Therefore, simplification and cost reduction of the controlled device can be achieved.

DETAILED DESCRIPTION OF THE PREFERRED EMBODIMENTS

Figure 1:
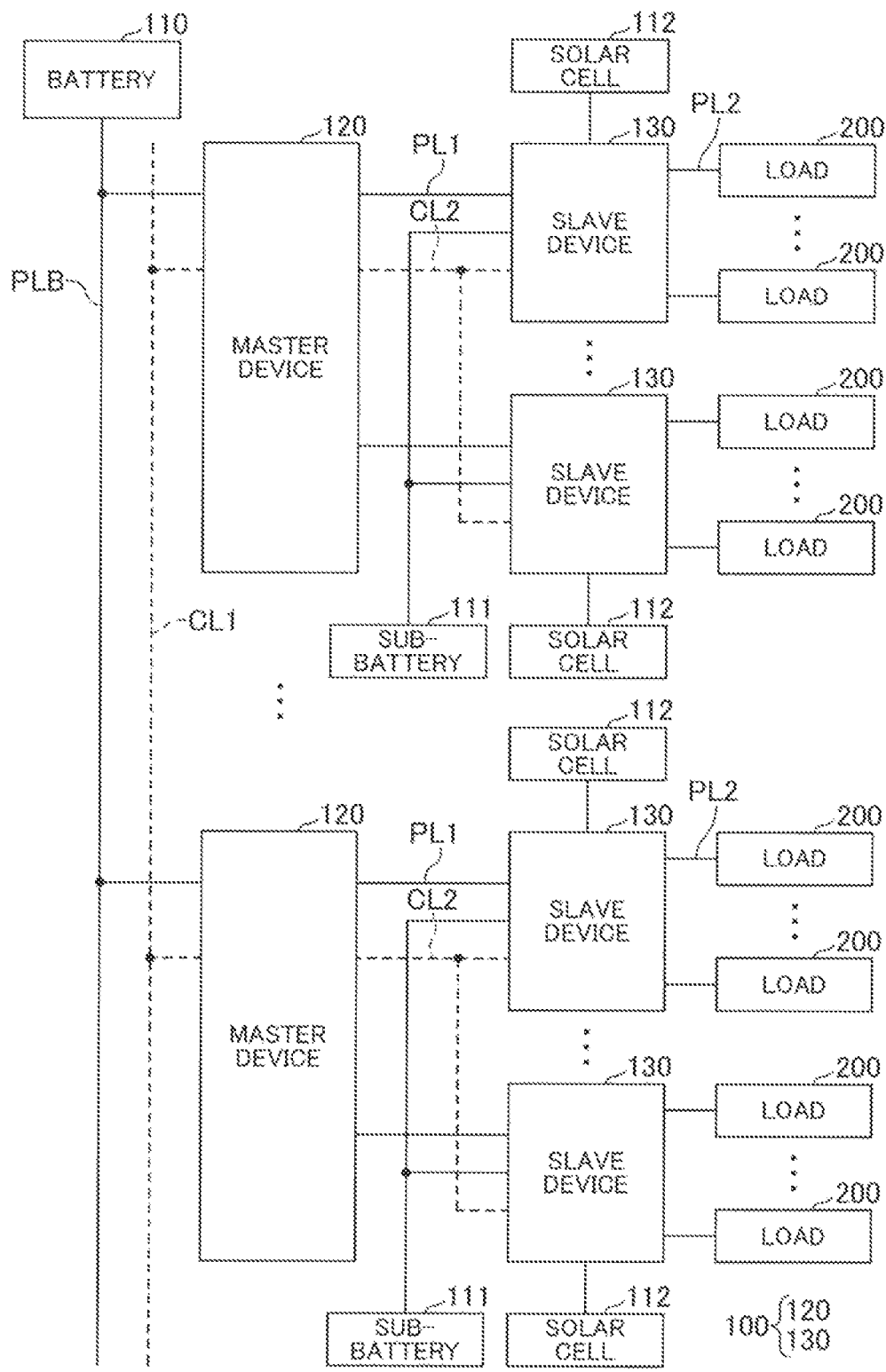
FIG. 1 is a schematic configuration diagram of a power control system according to an embodiment of the present invention.

Hereinafter, a first embodiment of the present invention will be described with reference to the drawings. FIG. 1 shows a schematic configuration diagram of a power control system according to the first embodiment of the present invention. A power control system 100 has a plurality of master devices 120 and a plurality of slave devices 130. In addition, the power control system 100 shown in FIG. 1 is assumed to be mounted on a vehicle such as an automobile, for example.

The master device 120 receives power from a battery 110 via a battery power supply line PLB. That is, the master device 120 functions as a main control device, and the battery 110 as a first power supply source. One master device 120 is connected to a plurality of slave devices via a first power supply line PL1, and the master device 120 and the slave device 130 connected to each other via the first power supply line PL1 form one sub-network.

One first power supply line PL1 corresponds to each of the plurality of slave devices 130. The slave device 130 is supplied with electric power from the master device 120 via the corresponding first power supply line PL1. That is, the slave device 130 functions as a controlled device supplied with power from the battery 110 (first power supply source) through the master device 120 (main control device).

The slave device 130 is connected to at least one load 200 via a second power supply line PL2. One second power supply line PL2 corresponds to each of the at least one load 200. The load 200 receives power from the slave device 130 via the corresponding second power supply line PL2. Here, the load 200 is, for example, electrical component such as a power window or a door lock.

The slave device 130 can also receive power from the sub-battery 111 or the solar cell 112. That is, the sub-battery 111 and the solar cell 112 acts as a second power supply source. While the solar cell 112 is connected to each slave device 130 in FIG. 1, a plurality of slaves may be connected with one solar cell 112 like the sub-battery 111.

The plurality of master devices 120 is connected to a first communication line CL1, and communicates with each other via the first communication line CL1. The first communication line CL1 is, for example, a communication line such as CAN (Controller Area Network), MOST (Media Oriented System Transport), FlexRay or the like. Also, the master device 120 is connected to a plurality of slave devices 130 in its own sub-network via a second communication line CL2, and the master device 120 controls communication with the slave device 130 in the sub network via the second communication line CL2.

Based on this communication, the slave device 130 controls the load 200 connected by the second power supply line PL2. The second communication line CL2 is, for example, a communication line for a protocol such as LIN (Local Interconnect Network), and the slave device 130 functions as a slave node in the LIN, the master device 120 as a master node in LIN. Note that the slave device 130 may also be connected to the first communication line CL1 connected to the master device 120, and the master device 120 may be connected to the slave device 130 via the first communication line CL1.

Figure 2:
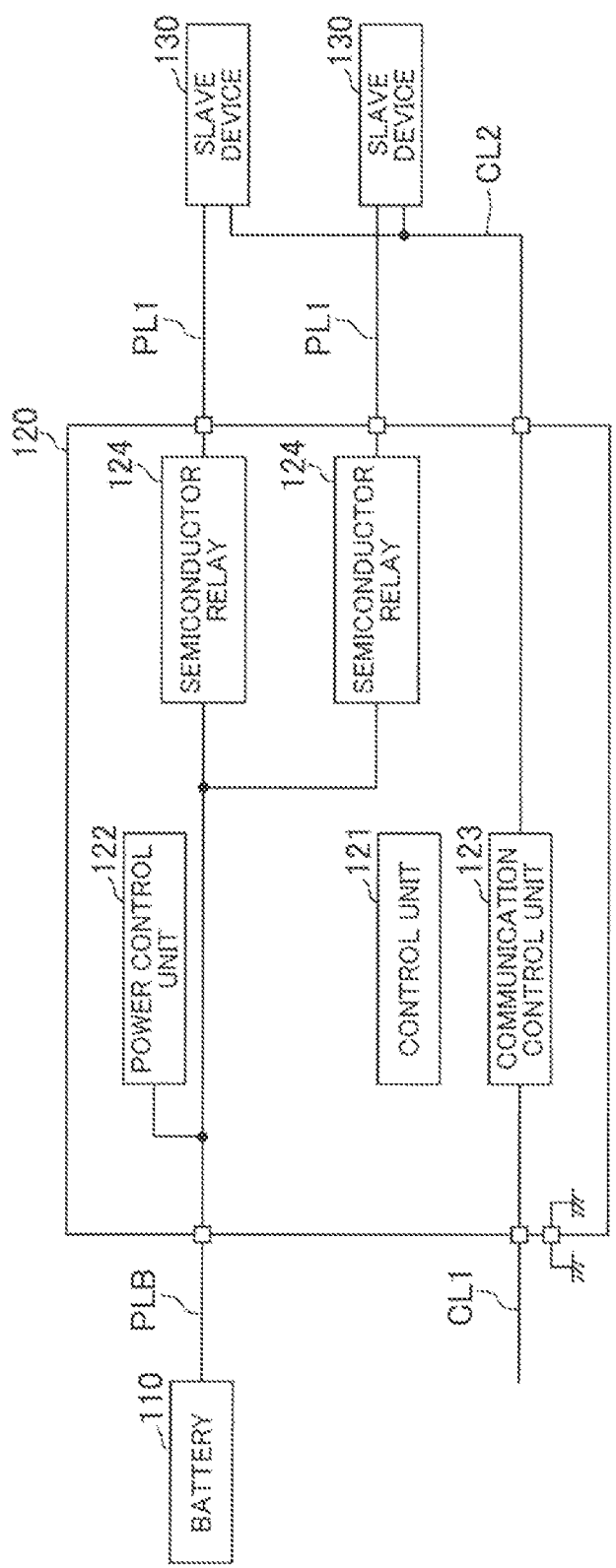
FIG. 2 is a schematic configuration diagram of a master device shown in FIG. 1.

FIG. 2 is a schematic configuration diagram of the master device 120. The master device 120 includes a control unit 121, a power control unit 122, a communication control unit 123, and a plurality of semiconductor relays (RLY) 124.

The control unit 121 includes a microcomputer having a CPU (Central Processing Unit), a memory such as ROM (Read Only Memory) or a RAM (Random Access Memory). The control unit 121 controls the overall control of the device 120 via a program executed by the CPU. In addition, the control unit 121 performs MPPT control process of the solar cell 112 connected to the slave device 130, charging determination process of the sub-battery 111, and switch selection process for turning off power supply source.

The power supply control unit 122 supplies power supplied within the master device 120 from the battery 110 as a certain voltage (for example, 5 V). The communication control unit 123 communicates with other master device 120 or the slave device 130. That is, communication according to a protocol such as CAN or LIN is performed. The communication control unit 123 receives signal to indicate current or voltage of the sub-battery 111 to be mentioned later from the slave device 130, or to indicate an amount of power generated by the solar cell 112 or the like to be mentioned later, and transmits a slave switch selection signal to be mentioned later to the slave device 130.

The semiconductor relay 124 switches, via the control unit 121, supplying or not electric power supplied from the battery 110 to the slave device 130. That is, each of the plurality of semiconductor relays 124 corresponds to one of the first power supply lines PL1, is placed upstream of the corresponding first power supply line PL1, and is connected to a terminal to which the corresponding first power supply line PL1 is connected via the power supply line.

As is clear from the above description, the master device 120 is a power control device according to the embodiment of the present invention, in which the semiconductor relay 124 functions as a power supply unit, the communication control unit 123 as a first acquisition unit and a first output unit.

Figure 3:
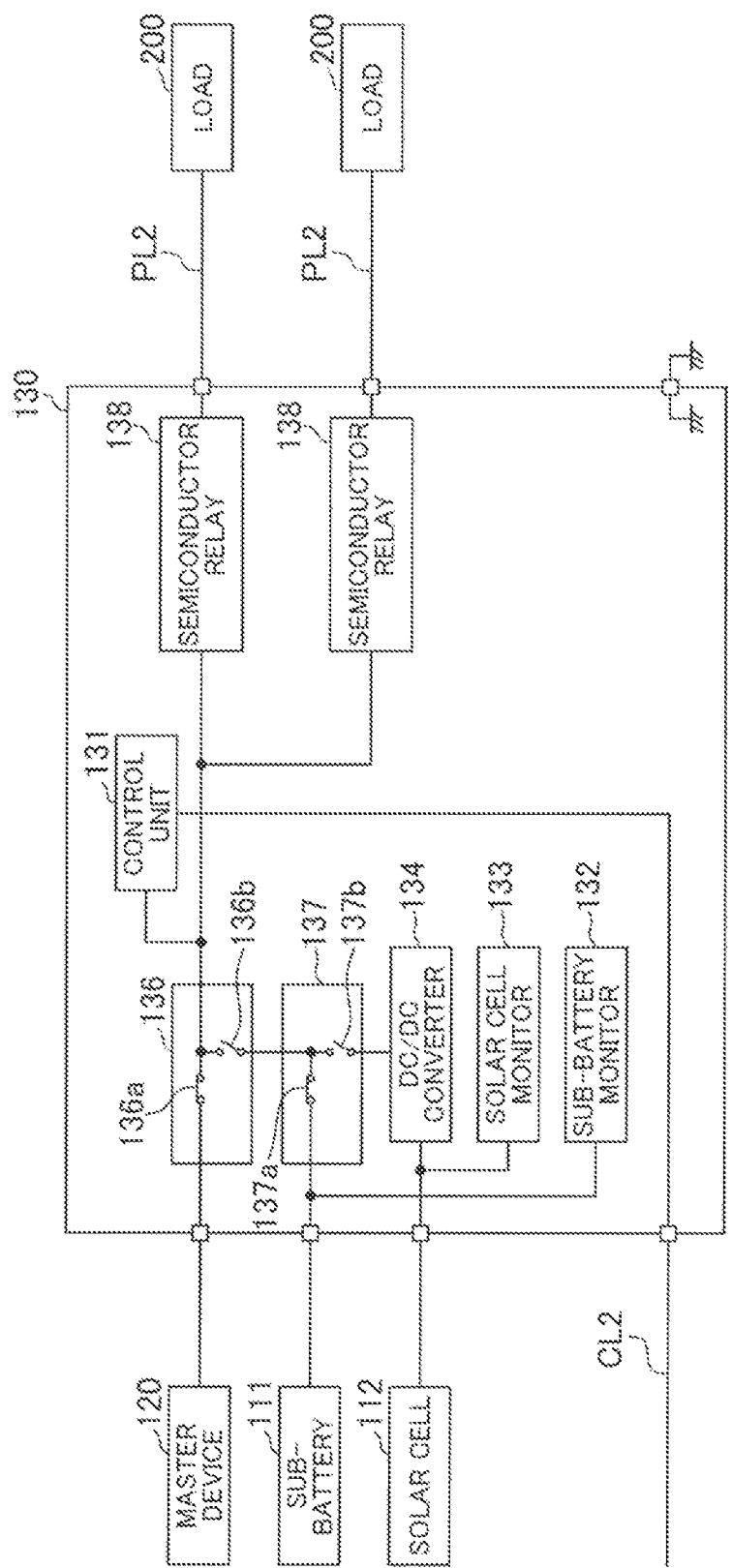
FIG. 3 is a schematic configuration diagram of a slave device shown in FIG. 1.

FIG. 3 is a schematic configuration diagram of the slave device 130. The slave device 130 includes a control unit 131, a sub-battery monitor 132, a solar cell monitor 133, a DC/DC converter 134, changeover switches 136 and 137, and a plurality of semiconductor relays (RLY) 138.

The control unit 131 is constituted by a microcomputer having a CPU (Central Processing Unit), and a memory such as ROM (Read Only Memory) and RAM (Random Access Memory). The control unit 131 controls the overall control of the device 130 by a program executed by the CPU. Further, the control unit 131 controls switching of the changeover switches 136 and 137 via the control signal received via the communication line CL2 from the master device 120. Further, the control unit 131 supplies power from the power supply source selected by the changeover switches 136 and 137 as a predetermined voltage (for example, 5 V) in the slave device 130.

The control unit 131 communicates with the master device 120, the other slave devices 130, or the load 200. That is, communication is performed according to a protocol such as LIN. The control unit 131 transmits from the slave device 130, for example, a signal indicating the current/voltage of the sub-battery 111 to be described later, a signal indicating the amount of power generated by the solar cell 112, and receives a changeover switch selection signal to be described later from the master device 120.

The sub-battery monitor 132 monitors the current, voltage, etc. of the sub-battery 111. The solar cell monitor 133 monitors power generation state (voltage, current, power generation amount, and the like) of the solar cell 112. The DC/DC converter 134 stabilizes the generated voltage (for example, 30V) of the solar cell 112, and then, outputs a predetermined voltage (for example, 5 V).

The changeover switch 136 includes a switch 136a and a switch 136b. The switch 136a turns on or off power supply from the master device 120 (battery 110). The switch 136b switches on or off power supply from the sub-battery 111 and/or the solar cell 112.

The changeover switch 137 includes a switch 137a and a switch 137b. The switch 137a switches on or off power supply from the sub-battery 111. The switch 137b switches on or off power supply from the DC/DC converter 134 (solar cell 112).

The semiconductor relay 138 switches whether or not to supply the power supplied from the battery 110 to the load 200. That is, each of the plurality of semiconductor relays 138 corresponds to one of the second power supply lines PL2, and is arranged upstream of the corresponding second power supply line PL2, and is connected via the power supply line to a terminal to which the corresponding second power supply line PL2 is connected.

As is clear from the above description, the slave device 130 is a controlled device according to an embodiment of the present invention, and the control unit 131 functions as a second output unit and a second acquisition unit.

Next, operation of the master device 120 and the slave device 130 having the above-described configuration will be described with reference to FIGS. 4 to 11. First, the operation of the master device 120 will be described with reference to the flowcharts of FIGS. 4 to 7.

Figure 4:
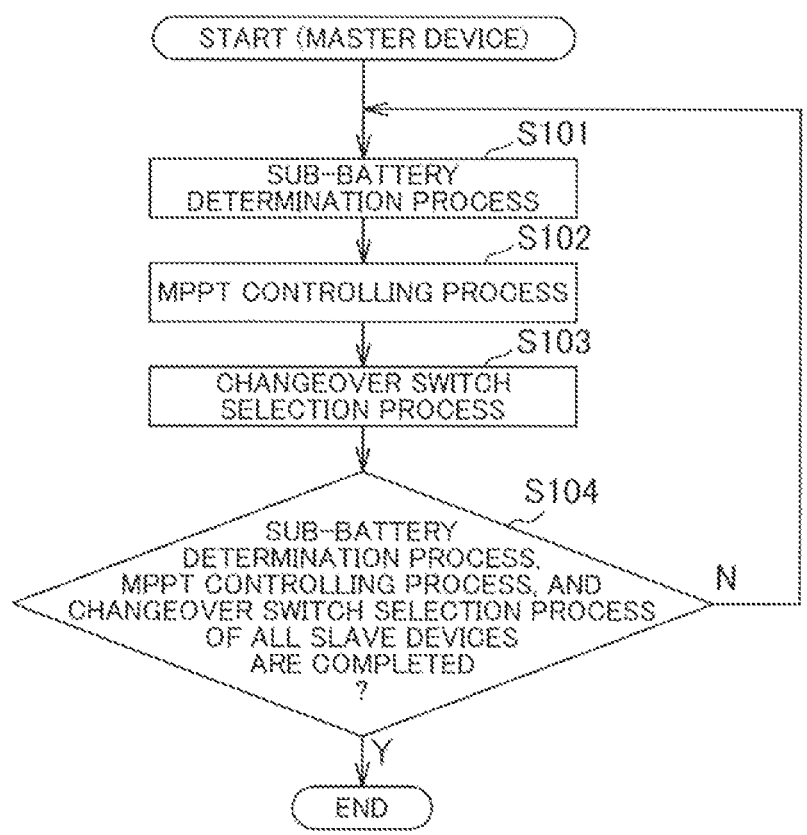
FIG. 4 is a flowchart of a power control operation of the master device shown in FIG. 1.

FIG. 4 is a flowchart of the power control operation of the master device 120. First, the control unit 121 performs sub-battery determination process (step S101), then performs MPPT control process (Step S102), and next, a changeover switch (SW) selection process (Step S103). Details of these processes will be described later. Then, when the sub-battery determination process, the MPPT control process, and the changeover switch selection process of all the slave devices 130 are completed (step S104: Y), the flowchart ends. On the other hand, when the sub-battery determination process, the MPPT control process, and the changeover switch selection process of all the slave devices 130 are not completed (step S104: N), process returns to step S101 and each process for the other slave devices 130 is performed.

Figure 5:
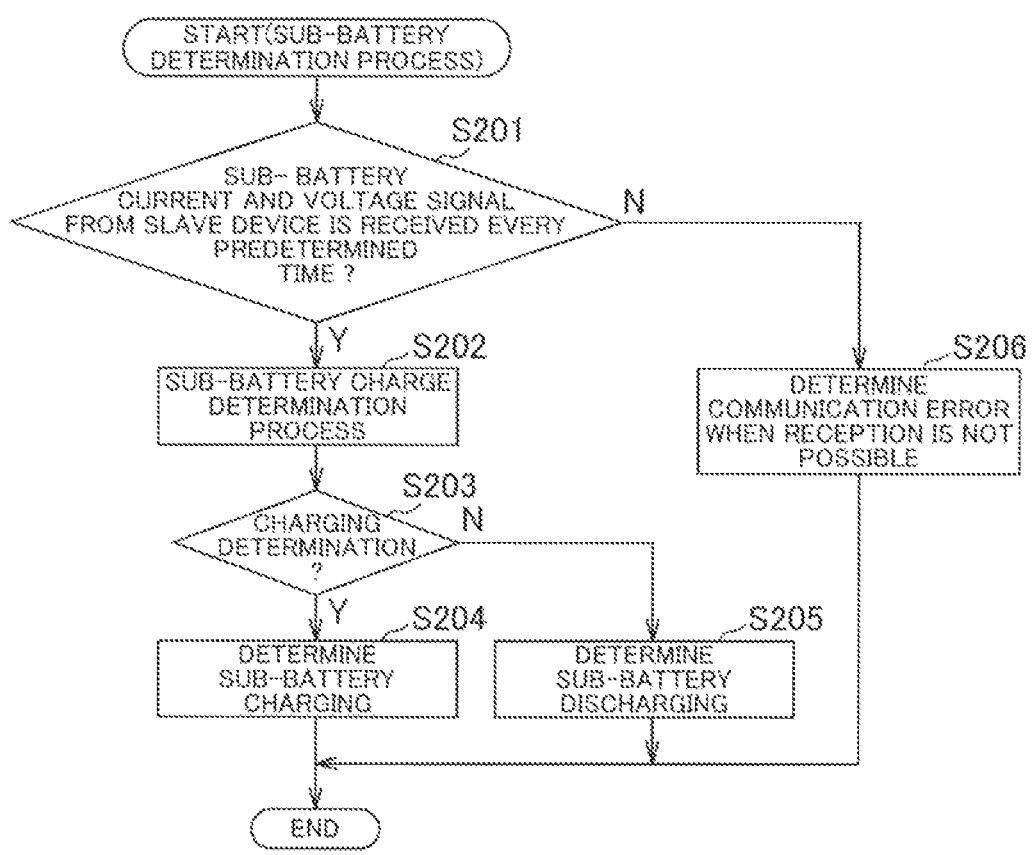
FIG. 5 is a flowchart of a sub-battery determination process shown in FIG. 4.

The sub-battery determination process will be described with reference to the flowchart in FIG. 5. The control unit 121, when receiving a signal indicating a current or voltage value of the sub-battery 111 from the slave device 130 every predetermined time (step S201: Y), executes a sub-battery charge determination process (step S202). That is, the signal indicating the value of the current or voltage of the sub-battery 111 becomes information on the power supply state of the sub-battery 111 (second power supply source). The sub-battery charge determination process is the process of determining the state of the sub-battery 111 such as SOH (States Of Health) and SOC (State Of Charge) of the sub-battery 111 based on the current or voltage received from the slave device 130. It should be noted that known method may be used for the SOH or SOC determination process.

Next, the control unit 121, when determining necessity to charge in the sub-battery charge determination process (step S203: Y), charging is determined (step S204) for the sub-battery 111. On the other hand, when determining that charging is not necessary in the sub-battery charge determination process (Step S203: N), the sub-battery 111 is determined to be discharged (step S205). These determination results are used in a changeover switch selection process described later. Therefore, these determination results become information based on the power supply state of the sub-battery 111 (second power supply source).

Also, the control unit 121, when not receiving the signal indicating the value of the current or the voltage of the sub-battery 111 from the slave device 130 every predetermined time (step S201: N), determines that the communication is abnormal (step S206). When the communication is determined abnormal, the semiconductor relay 124 is switched to shut off power supply to the slave device 130, thereby resetting the slave device 130. It should be noted that communication error may be determined when reception cannot be performed a predetermined number of times.

Figure 6:
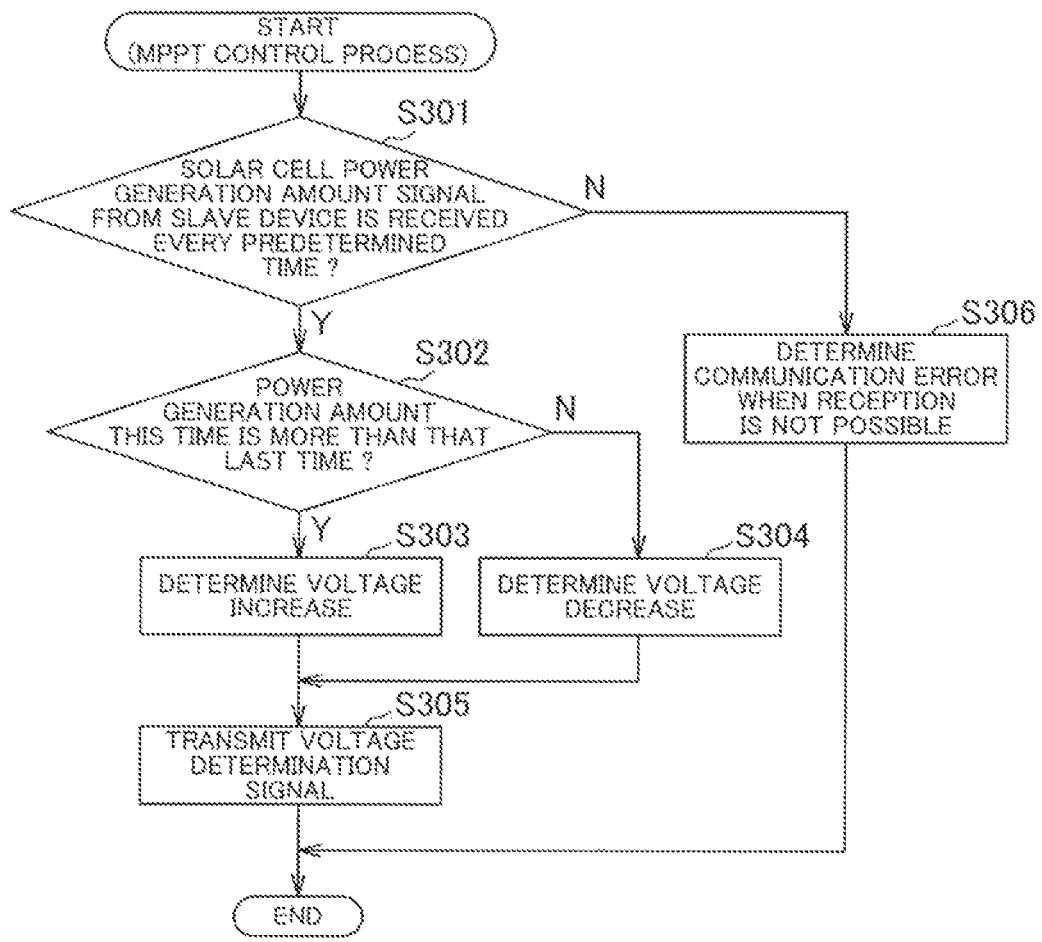
FIG. 6 is a flowchart of the MITT process shown in FIG. 4.

The MPPT control process will be described with reference to the flowchart in FIG. 6. The control unit 121, when received a signal indicating the amount of power generated by the solar cell 112 from the slave device 130 every predetermined time (step S301: Y), and a relationship is satisfied that the power generation amount received this time is more than the power generation amount received last time (step S302: Y), the voltage in the solar cell 112 is determined increasing (step S303). On the other hand, when a signal indicating the amount of power or the like of the solar cell 112 is received from the slave device 130 every predetermined time (step S301: Y), and a relationship is satisfied that the power generation amount received this time is equal to or less than the power generation amount received last time (step S302: N), a voltage in the solar cell 112 is determined reduced (step S304). Then, a signal indicating voltage determination (voltage determination signal) performed in steps S303 and S304 is transmitted to the slave device 130 (step S305). That is, the signal indicating the amount of power generated by the solar cell 112 or the like becomes information on the power supply state of the solar cell 112 (second power supply source).

Also, the control unit 121, when not received a signal indicating the power generation amount of the solar cell 112 from the slave device 130 every predetermined time (step S301: N), determines that communication is abnormal (step S306). If the communication is determined abnormal, the semiconductor relay 124 is switched to interrupt power supply to the slave device 130, and the slave device 130 is reset. Note that if receptions in the predetermined number are not possible, the communication may be determined abnormal.

The changeover switch selection process will be described with reference to the flowchart of FIG. 7. The control unit 121, when receives from the slave device 130 a signal indicating the power generation amount or the like of the solar cell 112 every predetermined time (step S401: Y), and a relationship is established that the power generation amount of the solar cell indicated by the signal is more than a predetermined threshold (step S402: Y), and the sub-battery 111 in the flowchart of FIG. 5 is determined charging (step S403: N), power supply is selected from the solar cell 112 in the slave device 130 (step S404).

Also, receiving from the slave device 130 a signal indicating the amount of power generated by the solar cell 112 or the like every predetermined time (step S401: Y), if the power generation amount of solar cell indicated by the signal is equal to or more than the predetermined threshold (step S402: Y), and the sub-battery 111 in the flowchart of FIG. 5 is determined discharging (step S403: Y), the sub-battery 111 charging operation is selected in the slave device 130 (step S405).

Also, receiving from the slave device 130 a signal indicating the amount of power generated by the solar cell 112 or the like every predetermined time (step S401: Y), if a relationship is established that the power generation amount of solar cell indicated by the signal is more that a predetermined threshold (step S402: N), and the sub-battery 111 is determined discharging in the flowchart shown in FIG. 5 (step S406: Y), power supply is selected from the sub-battery 111 in the slave device 130 (step S407).

Also, receiving from the slave device 130 the signal indicating the amount of power generated by the solar cell 112 or the like every predetermined time (step S401: Y), if a relationship is not established that the power generation amount of solar cell indicated by the signal is more than the predetermined threshold (step S402: N), and the sub-battery 111 is determined charging in the flowchart shown in FIG. 5 (step S406: N), power supply is selected from the battery 110 at the changeover switch 136 (step S408).

Then, the selection results of steps S404, S405, S407 and S408 are transmitted to the slave device 130 as the changeover switch selection signal (step S409).

Also, not receiving from the slave device 130 a signal indicating the power generation amount of the solar cell 112 every predetermined time (step S401: N), the control unit 121 determines that communication is abnormal (step S410). If the communication is determined abnormal, the semiconductor relay 124 is switched to interrupt power supply to the slave device 130, and the slave device 130 is reset. If receptions of the predetermined number of are not possible, the communication may be determined abnormal.

Figure 7:
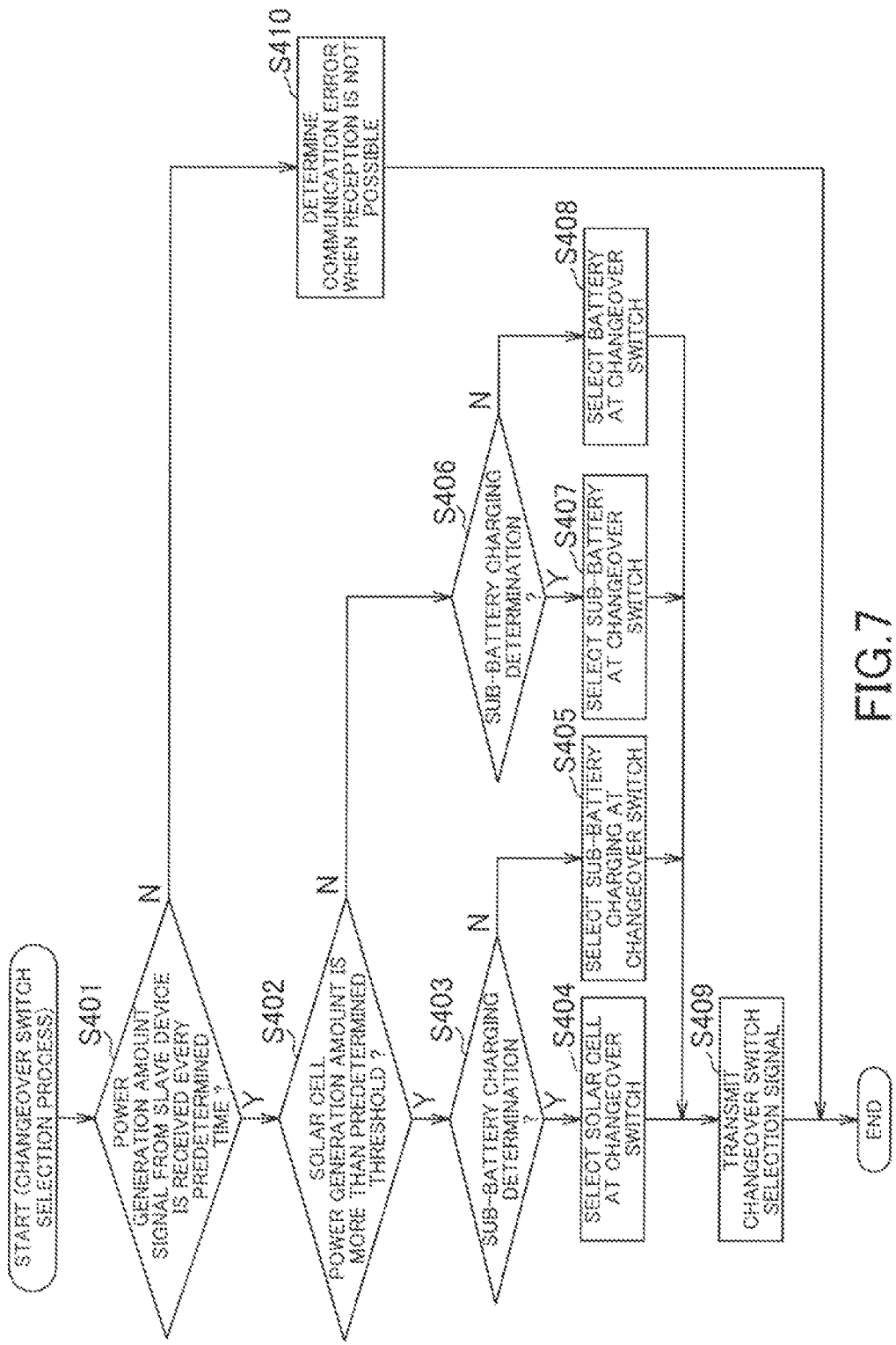
FIG. 7 is a flowchart of a changeover switch selection process shown in FIG. 4.

That is, according to the flowchart of FIG. 7, the control unit 121 controls to supply power to the slave device 130 (controlled device) from the sub-battery 111 or the solar cell 112 (second power supply source) based on the power supply state of the sub-battery 111 or the solar cell 112 (second power supply source).

Figure 8:
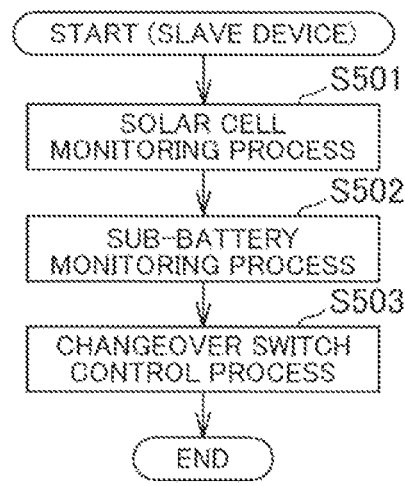
FIG. 8 is a flowchart of a power control operation of the master device shown in FIG. 1.

Next, the operation of the slave device 130 will be described with reference to FIGS. 8 to 11. FIG. 8 is a flowchart of power control operation of the master device 120. First, the control unit 131 executes monitoring process (step S501), then sub-battery monitoring process (step S502), and then a changeover switch (SW) controlling process (step S503). Details of these processes will be described later.

Figure 9:
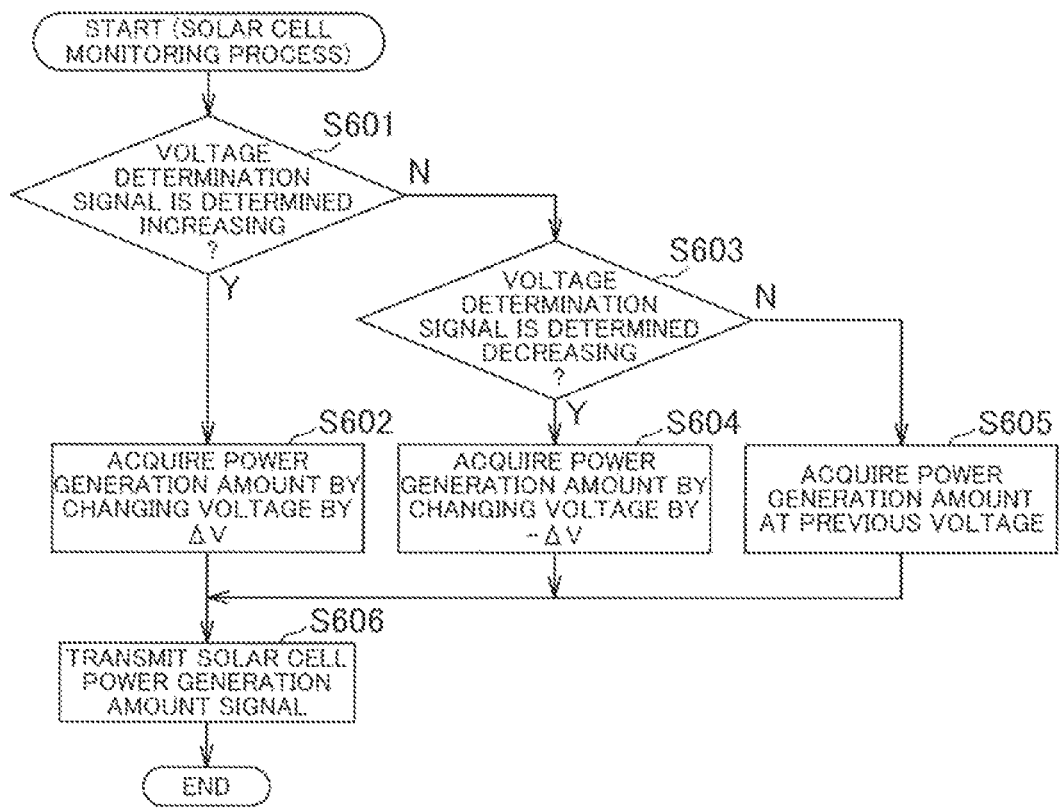
FIG. 9 is a flowchart of a power supply monitoring process shown in FIG. 8.

The solar cell monitoring process will be described with reference to the flowchart in FIG. 9. The solar cell monitor 133, when the voltage determination signal received from the master device 120 is not determined increasing (step S601: Y), obtains the power generation amount by changing the voltage by a predetermined value $\Delta V$ (step S602).

On the other hand, the solar cell monitor 133, when the voltage determination signal received from the master device 120 is not determined increasing (step S601: N), and is determined decreasing (step S603: Y), obtains the power generation amount by changing the voltage by a predetermined value of $-\Delta V$ (step S604).

Also, the solar cell monitor 133, when the acquired voltage determination signal is neither increasing determination nor a decreasing determination (step S601: N, step S603: N), the power generation amount is obtained at the previous voltage (step S605). Step S605 is also performed at times that the voltage determination signal has not been received.

Then, the control unit 131 transmits the power generation amount acquired by the solar cell monitor 133 in steps S602, S605, and S606 to the master device 120 through the communication line CL2 (step S606).

Figure 10:
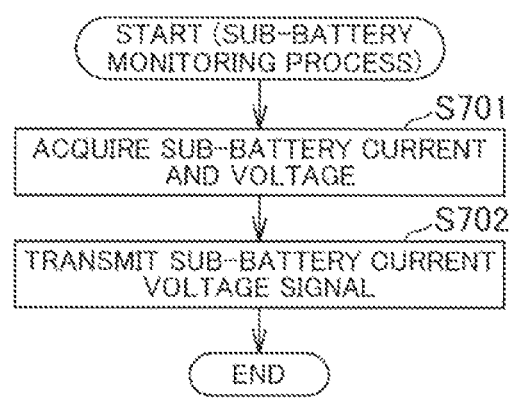
FIG. 10 is a flowchart of a sub-battery monitoring process shown in FIG. 8.

The sub-battery monitoring process will be described with reference to the flowchart in FIG. 10. The sub-battery monitor 132 acquires the current and voltage values of the sub-battery 111 (step S701). The control unit 131 transmits the acquired current and voltage value of the sub-battery 111 to the master device 120 through the communication line CL2 (step S702).

Figure 11:
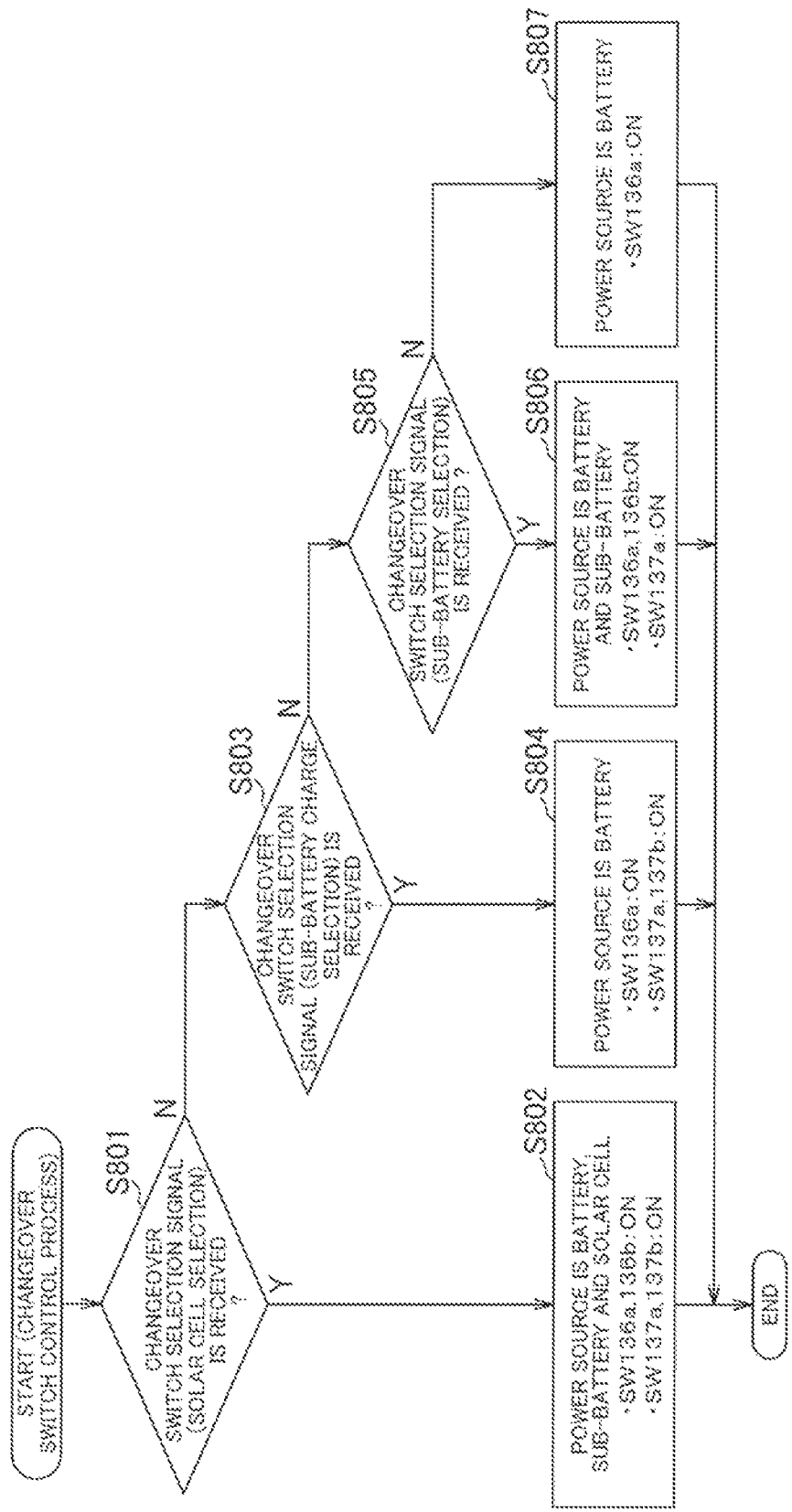
FIG. 11 is a flowchart of the changeover switch controlling processing shown in FIG. 8.

The changeover switch controlling process will be described with reference to the flowchart in FIG. 11. The control unit 131, when the changeover switch selection signal received from the master device 120 is a power supply selection (step S801: Y), uses all of the battery 110, the sub-battery 111 and the solar cell 112 as a power source (power supply source). Therefore, the switch 136a and the switch 136b of the changeover switch 136, and the switch 137a and the switch 137b of the changeover switch 137 are turned on (step S802).

Also, when the changeover switch selection signal received from the master device 120 is not solar cell selection (step S801: N) but sub-battery charge selection (step S803: Y), the control unit 131 uses the battery 110 as a power supply source. Therefore, the changeover switch 136a of the changeover switch 136 is turned on, the switch 136b off, the switch 137a the changeover switch 137 on, and the switch 137b on (step S804). At this time, turning on the switch 137a and the switch 137b allows the sub-battery 111 to be charged via the solar cell 112.

Also, when the changeover switch selection signal received from the master device 120 is not the solar cell selection (step S801: N), not the sub-battery charge selection (step S803: N), and not the sub-battery selection (step S805: Y), the control unit 131 uses the battery 110 and the sub0battery 111 as a power supply source. Therefore, the switch 136a of the changeover switch 136 is turned on, the switch 136b on, the switch 137a of the changeover switch 137 on, and the switch 137b off (step S806).

Also, when the changeover switch selection signal received from the master device 120 is not solar cell selection (step S801: N), not the sub-battery charge selection (step S803: N), and not the sub-battery selection (step S805: N), the control unit 131 only uses the battery 110 as a power supply source. Therefore, the switch 136a of the changeover switch 136 is turned ON, the switch 136b off, the switch 137a of the changeover switch 137 off, and the switch 137b off (step S807).

That is, the changeover switches 136 and 137 work as a switching unit for switching power supply from the sub-battery 111 or the solar cell 112 (second power supply source) in addition to the power supply source from the master device 120 (main control device) based on control from the master device 120 (main control device).

According to the present embodiment, the power control system 100 is provided with the master device 120 powered from the battery 110 and slave device 130 powered from the battery 110 through the master device 120. And the slave device 130 can also be supplied power from the sub-battery 111 different from the battery 110 and the solar cell 112, and the master device 120 is provided with the control unit 121 controlling such that power is supplied from the sub-battery 111 and the solar cell 112 to the slave device 130 based on information on the power supply state of the sub-battery 111 and the solar cell 112.

With the power control system 100 configured as described above, since power supply is controlled based on information in the master device 120 on the power supply state of the sub-battery 111 and the solar cell 112, the processing in the slave device 130 can be simplified. Therefore, simplification and cost reduction of the slave device 130 can be achieved.

Also, since the slave device 130 is provided with the switches 136 and 137 for switching power supply from the sub-battery 111 and the solar cell 112 in addition to the master device 120 based on the control from the master device 120, switching on and off the switch can switch power supply. Therefore, the configuration can be simplified.

Also, since the MPPT control is performed on the solar cell 112, power can be controlled to generate at the maximum output.

In the above-described embodiment, power is always supplied from the battery 110. However, power supply from the battery 110 may be cut off and power may be supplied from the sub-battery 111 or the solar cell 112. That is, the switch 136a may be controlled to be turned off.

The present invention is not limited to the above embodiment. In other words, those skilled in the art can make and carry out various modifications according to the knowledge without departing from the gist of the present invention. Of course, various modifications, as long as having the configuration of the power control system, the power control device and the controlled device of the present invention, are included in the category of the present invention.

REFERENCE SIGNS LIST 100 power control system
110 battery (first power supply source)
111 sub-battery (second power supply source)
112 solar cell (second power supply source)
120 master device (main controller)
121 control unit 123 communication control unit (first acquisition unit, first output unit)
124 semiconductor relay (power supply unit)
130 slave device (controlled device)
131 control unit (second output unit, second acquisition unit)
136 changeover switch (switching section)
137 changeover switch (switching section)

What is claimed is:

1. A power control system including a main control device supplied with power supply from a first power supply source and a plurality of controlled devices supplied with power from the first power supply source through the main control device, the power control system comprising:
  a second power supply source, different from the first power supply source and capable of supplying power to each of the controlled devices, wherein
  the main control device controls each of the controlled devices such that power is supplied from the second power supply source to each of the controlled devices based on information on a power supply state of the second power supply source acquired from each of the controlled devices,
  the main control device comprises at least one processor,
  at least one load connected to each of the controlled devices is supplied with power from each of the controlled devices, and
  wherein the second power supply source is a solar cell.

2. The power control system according to claim 1, wherein
  each of the controlled devices is provided with a switching unit that switches power supply from the second power supply source in addition to power supply through the main control device based on control by the main control device.

3. The power control system according to claim 1, wherein
  the main control device performs a tracking maximum power point control for the solar cell.

4. The power control system according to claim 1,
  wherein each of the controlled devices comprises at least one second processor.

5. The power control system according to claim 1,
  wherein the information on the power supply state of the second power supply source acquired from each of the controlled devices indicates at least whether a communication error has occurred.

6. An in-vehicle power control device comprising:
  at least one processor configured to implement:
    a power supply unit configured to supply power supplied from a first power supply source to a plurality of controlled devices;
    a first acquisition unit configured to acquire from each of the controlled devices a power supply state of a second power supply source connected to each of the controlled devices; and
    a first output unit configured to output a control signal controlling each of the controlled devices so that power is supplied from the second power supply source based on information on the power supply state acquired by the first acquisition unit,
  wherein at least one load connected to each of the controlled devices is supplied with power from each of the controlled devices, and
  wherein the second power supply source is a solar cell.

7. Each of the controlled devices connected to the in-vehicle power control device according to claim 6, comprising:
  a second output configured to output information on the power supply state of the second power supply source to the first acquisition unit;
  a second acquisition unit configured to acquire the control signal output by the first acquisition unit; and
  a switching unit configured to switch power supply from the second power supply source and power supply from the power supply unit based on the control signal.

8. An in-vehicle power control device comprising:
  a power supply unit configured to supply power supplied from a first power supply source to a plurality of controlled devices;
  a first acquisition unit configured to acquire from each of the controlled devices a power supply state of a second power supply source connected to each of the controlled devices; and
  a first output unit configured to output a control signal controlling each of the controlled devices so that power is supplied from the second power supply source based on information on the power supply state acquired by the first acquisition unit,
  wherein
  at least one load connected to each of the controlled devices is supplied with power from each of the controlled devices, and
  each of the controlled devices comprises:
    a second output configured to output information on the power supply state of the second power supply source to the first acquisition unit;
    a second acquisition unit configured to acquire the control signal output by the first acquisition unit; and
    a switching unit configured to switch power supply from the second power supply source and power supply from the power supply unit based on the control signal, and
  wherein the second power supply source is a solar cell.

* * * * *